United States Patent Office 3,257,389
Patented June 21, 1966

3,257,389
19-BISDIFLUORO-PREGNANES
Albert Bowers and James C. Orr, Mexico City, Mexico, assignors to Syntex Corporation, Panama, Panama, a corporation of Panama
No Drawing. Filed Sept. 21, 1962, Ser. No. 225,364
20 Claims. (Cl. 260—239.55)

The present invention relates to novel cyclopentanophenanthrene derivatives and to a process for the production thereof.

More particularly, the present invention relates to novel 19,19-difluoro-pregnane derivatives.

The novel compounds of the present invention are represented by the following formulae:

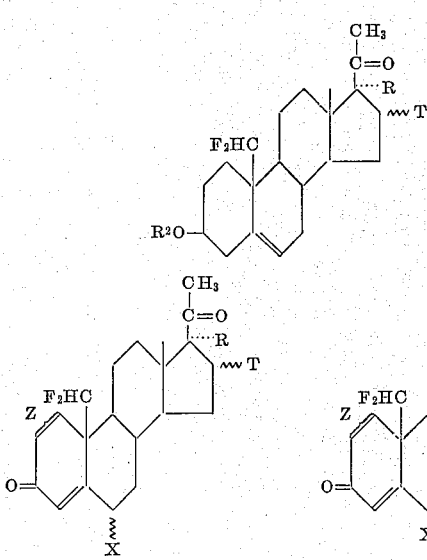

In the above formulae X represents hydrogen, fluorine or chlorine all having α- or β-configurations; R represents hydrogen, hydroxyl or a hydrocarbon carboxylic acyloxy group of less than 12 carbon atoms; T represents hydrogen, α-hydroxyl, α-acyloxy, α-methyl or β-methyl; T and R together represent the group

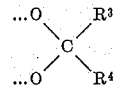

at the 16α,17α-position, wherein $R^3$ and $R^4$ each represents a lower alkyl group; Z represents a double bond or a saturated linkage between C–1 and C–2, and $R^2$ represents a hydrogen or a hydrocarbon carboxylic acyl group of less than 12 carbon atoms.

The acyl and acyloxy groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The compounds represented by the above formulae are powerful progestational agents with good oral activity. In addition they have anti-androgenic, anti-gonadotrophic and anti-estrogenic properties and are useful in fertility control, furthermore they may be used in the treatment of pre-menstrual tension.

The novel compounds of the present invention are prepared by the process exemplified as follows:

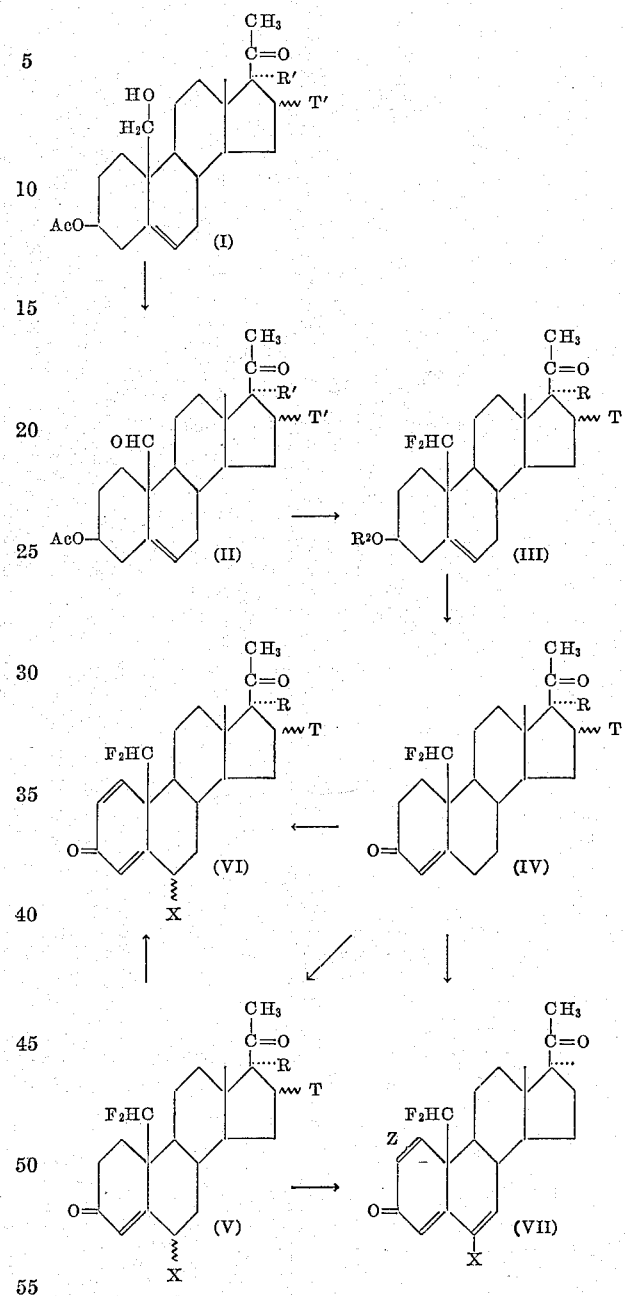

In the above formulae R, T, X, Z and $R^2$ have the same meaning as described previously; $R^1$ represents hydrogen or a hydrocarbon carboxylic acyl group of less than 12 carbon atoms; $T^1$ represents hydrogen, α-acyloxy, α-methyl or β-methyl; $T^1$ and $R^1$ together represent the group

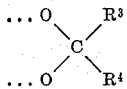

wherein $R^3$ and $R^4$ have the same meaning as set forth hereinbefore.

The starting compound (I) of the above exemplified process which is a 3-acyloxy-19-hydroxy-20-keto-Δ⁵-pregnene derivative, is obtained in accordance with U.S. Patent No. 3,065,228 to Bowers, by treatment of the corresponding 3-acyloxy-Δ⁵-pregnene with hypobromous acid, to give the corresponding 3-acyloxy-5α-bromo-6β-hydroxy-pregnane, reacting the latter with lead tetraacetate to produce the corresponding 3-acyloxy-5α-bromo-6β,19-oxido-pregnene derivative and finally treating the latter compound with zinc in a lower aliphatic alcohol.

In practicing the process outlined above the starting compound (I) is oxidized, preferably with chromium trioxide in pyridine, thus giving the corresponding Δ$^5$-pregnen-3β-ol-19-al-20-one acylate (II), which upon treatment with approximately 2 molar equivalents of sulfur tetrafluoride in a sealed vessel, at approximately 0–50° C., for a prolonged period of time of the order of 6 to 14 days, preferably during 8 days, yields the corresponding 19,19-difluoro-Δ$^4$-pregnen-3β-ol-20-one acylate (III: R$^2$=acyl). Conventional saponification of the acyloxy group of the latter derivative affords the corresponding free 3β-alcohol (III: R$^2$=H). The latter compound having the remaining hydroxyl groups present protected (III: R=R$^1$, T=T$^1$) is treated under conventional Oppenauer conditions to give the corresponding 19,19-difluoro-Δ$^4$-pregnene-3,20-dione derivative (IV). The latter compound upon treatment with ethyl orthoformate in the presence of p-toluenesulfonic acid affords the corresponding 19,19-difluoro-3-ethoxy-Δ$^{3,5}$-pregnadien-20-one which is treated with approximately 1 molar equivalent of N-chloro succinimide or another N-chloro amide or imide, in the presence of acetic acid and sodium acetate, or with perchloryl fluoride, in dimethylformamide, thus affording respectively the corresponding 6β-chloro-19,19-difluoro-Δ$^4$-pregnene-3,20-dione and 6β,19,19-trifluoro-Δ$^4$-pregnene-3,20-dione (V: X=β-fluoro or β-chloro).

The β-halo group of the latter compounds is epimerized in an acid medium such as hydrogen chloride in acetic acid, to give the corresponding 6α-halo derivatives (V: X=α-fluoro or α-chloro). The 19,19-difluoro-Δ$^4$-3,20-dione derivative of the present invention (IV, V) upon reaction with chloranil in xylene or t-butanol at reflux temperature for a period of time between 8 and 16 hours produced the corresponding Δ$^{4,6}$-derivatives (VII: Z=saturated linkage).

The 19,19-difluoro-Δ$^4$-pregnene-3,20-dione derivatives of the present invention (IV, V) are treated with 2,3-dichloro-5,6-dicyano-1,4-benzoquinone in a suitable solvent, such as dioxane, preferably at reflux temperature for a period of time of 10 hours to produce the corresponding Δ$^{1,4}$-pregnadiene derivatives (VI). When the aforementioned Δ$^{4,6}$-derivatives are treated under the same conditions, there are obtained the corresponding Δ$^{1,4,6}$-pregnatriene compounds (VII: Z=double bond).

The compounds of the present invention having a 16α, 17α-ketonide grouping produce the corresponding 16α, 17α-diols by conventional treatment with a strong acid, such as formic acid. The obtained diols, upon conventional esterification in pyridine, with an acylation agent, such as for example acetic anhydride or caproic anhydride, produce the corresponding 16-acylates.

The compounds of the present invention having a 17α-hydroxy group are conventionally acylated in the presence of p-toluenesulfonic acid with an acylating agent such as an anhydride of a hydrocarbon carboxylic acid of the type disclosed hereinbefore to give the corresponding 17α-acylates.

The following specific examples serve to illustrate but are not intended to limit the scope of the present invention:

EXAMPLE I

A solution of 6 g. of Δ$^5$-pregnene-3β,19-diol-20-one 3-acetate (obtained in accordance with U.S. Patent No. 3,065,228 to Bowers) in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded Δ$^5$-pregnene-3β-ol-19-al-20-one acetate (Compound No. 1).

Following the some procedure, the starting compounds listed under I (obtained in accordance with U.S. Patent No. 3,065,228 to Bowers and copending application Serial No. 194,717, filed May 14, 1962 now U.S. Patent No. 3,124,574) were respectively converted into the products set forth under II.

| I | Cpd. No. | II |
|---|---|---|
| 16α-methyl-Δ$^5$-pregnene-3β,19-diol-20-one 3-acetate. | 2 | 16α-methyl-Δ$^5$-pregnene-3β-ol-19-al-20-one acetate. |
| 16β-methyl-Δ$^5$-pregnene-3β,19-diol-20-one 3-acetate. | 3 | 16β-methyl-Δ$^5$-pregnene-3β-ol-19-al-20-one acetate. |
| 16α,17α-isopropylidenedioxy-Δ$^5$-pregnene-3β,19-diol-20-one 3-acetate. | 4 | 16α,17α-isopropylidenedioxy-Δ$^5$-pregnene-3β-ol-19-al-20-one acetate. |
| Δ$^5$-pregnene-3β,17α,19-triol-20-one 3,17-diacetate. | 5 | Δ$^5$-pregnene-3β,17α-diol-19-al-20-one diacetate. |
| 16α-methyl-Δ$^5$-pregnene-3β,17α,19-triol-20-one 3,17-diacetate. | 6 | 16α-methyl-Δ$^5$-pregnene-3β,17α-diol-19-al-20-one diacetate. |
| 16β-methyl-Δ$^5$-pregnene-3β,17α,19-triol-20-one 3,17-diacetate. | 7 | 16β-methyl-Δ$^5$-pregnene-3β,17α-diol-19-al-20-one diacetate. |

EXAMPLE II 500 mg. of Δ$^5$-pregnene-3β-ol-19-al-20-one acetate (Cpd. No. 1) were dissolved in 25 cc. of dioxane and treated at —70° C. with 2 molar equivalents of sulfur tetrafluoride. The reaction vessel was sealed and the temperature permitted to attain 20° C. After 8 days, the reaction mixture was cooled and the contents of the tube poured carefully into ice water. An excess of sodium carbonate was added and the product extracted with methylene chloride. The extract was washed with water to neutral, dried and evaporated to dryness. After chromatography and crystallization of the solid fractions from acetone-hexane, there was obtained 19,19-difluoro-Δ$^5$-pregnene-3β-ol-20-one acetate (Cpd. No. 8).

The compounds Nos. 2 to 7, inclusive, were treated in accordance with the above procedure, thus affording respectively—

Cpd. No.:
9. 19,19 - difluoro - 16α - methyl - Δ$^5$ - pregnene-3β-ol-20-one acetate.
10. 19,19 - difluoro - 16β - methyl - Δ$^5$ - pregnene-3β-ol-20-one acetate.
11. 19,19 - difluoro - 16α,17α - isopropylidenedioxy-Δ$^5$-pregnene-3β-ol-20-one acetate.
12. 19,19 - difluoro - Δ$^5$ - pregnene - 3β,17α - diol-20-one diacetate.
13. 19,19 - difluoro - 16α - methyl - Δ$^5$ - pregnene-3β,17α-diol-20-one diacetate.
14. 19,19 - difluoro - 16β - methyl - Δ$^5$ - pregnene-3β,17α-diol-20-one diacetate.

EXAMPLE III

A suspension of 1 g. of 19,19-difluoro-Δ$^5$-pregnene-3β-ol-20-one acetate (Cpd. No. 8) in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield 19,19-difluoro-Δ$^5$-pregnene-3β-ol-20-one (Cpd. No. 15).

The compounds Nos. 9 to 14, inclusive, were treated in the same manner, thus giving respectively the following compounds—

Cpd. No.:
16. 19,19 - difluoro - 16α - methyl - Δ$^5$ - pregnene-3β-ol-20-one.
17. 19,19 - difluoro - 16β - methyl - Δ$^5$ - pregnene-3β-ol-20-one.
18. 19,19 - difluoro - 16α,17α - isopropylidenedioxy-Δ$^5$-pregnene-3β-ol-20-one.

19. 19,19-difluoro-Δ⁵-pregnene-3β,17α-diol-20-one-17-acetate.
20. 19,19-difluoro-16α-methyl-Δ⁵-pregnene-3β,17α-diol-20-one 17-acetate.
21. 19,19-difluoro-16β-methyl-Δ⁵-pregnene-3β,17α-diol-20-one 17-acetate.

EXAMPLE IV

A solution of 1 g. of 19,19-difluoro-Δ⁵-pregnene-3β-ol-20-one (Cpd. No. 15) in 80 cc. of toluene and 20 cc. of cyclohexanone was dried by distilling off 10 cc. of the solvent. A solution of 1 g. of aluminum isopropoxide dissolved in 7 cc. of anhydrous toluene was then added and the mixture was refluxed for 45 minutes; 4 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated to dryness. Crystallization from acetone-hexane afforded 19,19-difluoro-Δ⁴-pregnene-3,20-dione (Cpd. No. 22).

Following the same procedure, the compounds Nos. 16 to 21, inclusive, were respectively transformed into—

Cpd. No.:
23. 19,19-difluoro-16α-methyl-Δ⁴-pregnene-3,20-dione.
24. 19,19-difluoro-16β-methyl-Δ⁴-pregnene-3,20-dione.
25. 19,19-difluoro-16α,17α-isopropylidenedioxy-Δ⁴-pregnene-3,20-dione.
26. 19,19-difluoro-Δ⁴-pregnene-17α-ol-3,20-dione acetate.
27. 19,19-difluoro-16α-methyl-Δ⁴-pregnene-17α-ol-3,20-dione acetate.
28. 19,19-difluoro-16β-methyl-Δ⁴-pregnene-17α-ol-3,20-dione acetate.

EXAMPLE V

A mixture of 500 mg. of 19,19-difluoro-Δ⁴-pregnene-3,20-dione (Cpd. No. 22), 10 cc. of dioxane and 350 mg. of 2,3-dichloro-5,6-dicyano-1,4-benzoquinone was refluxed for 10 hours. It was then cooled, the 2,3-dichloro-5,6-dicyano-1,4-benzohydroquinone formed during the reaction filtered off, and the filtrate evaporated to dryness. The residue was dissolved in acetone and filtered through 10 g. of alumina. Crystallization from acetone-hexane gave 19,19-difluoro-Δ¹,⁴-pregnadiene-3,20-dione (Cpd. No. 29).

Following the same procedure, the compounds Nos. 23 to 28, inclusive, were respectively transformed into—

Cpd. No.:
30. 19,19-difluoro-16α-methyl-Δ¹,⁴-pregnadiene-3,20-dione.
31. 19,19-difluoro-16β-methyl-Δ¹,⁴-pregnadiene-3,20-dione.
32. 19,19-difluoro-16α,17α-isopropylidenedioxy-Δ¹,⁴-pregnadiene-3,20-dione.
33. 19,19-difluoro-Δ¹,⁴-pregnadiene-17α-ol-3,20-dione acetate.
34. 19,19-difluoro-16α-methyl-Δ¹,⁴-pregnadiene-17α-ol-3,20-dione acetate.
35. 19,19-difluoro-16β-methyl-Δ¹,⁴-pregnadiene-17α-ol-3,20-dione acetate.

EXAMPLE VI

A mixture of 1 g. of 19,19-difluoro-Δ⁴-pregnene-3,20-dione (Cpd. No. 22), 2 g. of chloranil and 10 cc. of xylene was refluxed under an atmosphere of nitrogen for 16 hours. The mixture was cooled, washed with a cold 10% sodium hydroxide solution, then with water, dried over anhydrous sodium sulfate and the xylene was evaporated under reduced pressure. Chromatography of the residue on neutral alumina and recrystallization from acetone-hexane afforded 19,19-difluoro-Δ⁴,⁶-pregnadiene-3,20-dione (Cpd. No. 36). By the same procedure, Compound No. 27 was converted into: 19,19-difluoro-16α-methyl-Δ⁴,⁶-pregnadiene-17α-ol-3,20-dione acetate (Cpd. No. 37).

EXAMPLE VII

A suspension of 1 g. of 19,19-difluoro-Δ⁴-pregnene-3,20-dione (Cpd. No. 22) in 7.5 cc. of anhydrous peroxide-free dioxane was treated with 1.2 cc. of freshly distilled ethyl orthoformate and 0.8 g. of p-toluenesulfonic acid. The mixture was stirred at room temperature for 15 minutes and the resulting solution let stand for 30 minutes further. 0.8 cc. of pyridine were added and then water. The formed precipitate was collected by filtration, water washed and air dried. Recrystallization from acetone-hexane afforded 19,19-difluoro-3-ethoxy-Δ³,⁵-pregnadiene-20-one (Cpd. No. 38). By the same procedure, Compound No. 27 was transformed into: 19,19-difluoro-16α-methyl-3-ethoxy-Δ³,⁵-pregnadiene-17α-ol-20-one acetate (Cpd. No. 39).

EXAMPLE VIII

A mixture of 5 g. of 19,19-difluoro-3-ethoxy-Δ³,⁵-pregnadiene-20-one (Cpd. No. 38), 2 g. of anhydrous sodium acetate and 100 cc. of acetone was treated with 32 cc. of water and the solution was cooled to a temperature between 0 and 5° C. There was then added 1.1 molar equivalents of N-chloro-succinimide and 2 cc. of glacial acetic acid and the mixture was stirred between 0 and 5° C. for 30 minutes. It was then diluted with water, kept overnight at 0° C. and the precipitate formed was collected, washed with water, dried under vacuum and recrystallized from acetone, thus giving 6β-chloro-19,19-difluoro-Δ⁴-pregnene-3,20-dione (Cpd. No. 40). By the same procedure, compound No. 39 was converted into: 6β-chloro-19,19-difluoro-16α-methyl-Δ⁴-pregnene-17α-ol-3,20-dione acetate (Cpd. No. 41).

EXAMPLE IX 1 g. of 19,19-difluoro-3-ethoxy-Δ³,⁵-pregnadiene-20-one (Cpd. No. 38) was dissolved in 25 cc. of dimethylformamide. The solution was cooled to 0° C. and a stream of perchloryl fluoride was passed for 5 minutes; the solution was allowed to come slowly to 20° C.; it was then poured into water and extracted with ethyl acetate. The extract was washed with saturated aqueous solution of sodium bicarbonate, then with water to neutrality, dried over anhydrous sodium sulfate, and evaporated to dryness. By chromatography over washed alumina there was obtained 6β,19,19-trifluoro-Δ⁴-pregnene-3,20-dione (Cpd. No. 42).

Following the same procedure, but using compound No. 39 as starting material, there was produced 6β,19,19-trifluoro-16α-methyl-Δ⁴-pregnene-17α-ol-3,20-dione acetate (Cpd. No. 43).

EXAMPLE X

Into a solution of 3 g. of compound No. 40 in 150 cc. of glacial acetic acid was passed a slow stream of dry hydrochloric acid for 4 hours, while maintaining the temperature around 15° C. The mixture was then poured into ice-water, the precipitate collected, washed with water, dried and recrystallized from acetone-hexane to give 6α-chloro-19,19-difluoro-Δ⁴-pregnene-3,20-dione (Cpd. No. 44).

The compounds Nos. 41, 42 and 43 were treated by the same procedure, thus yielding respectively: 6α-chloro-19,19-difluoro-16α-methyl-Δ⁴-pregnene-17α-ol-3,20-dione acetate (Cpd. No. 45), 6α,19,19-trifluoro-Δ⁴-pregnene-3,20-dione (Cpd. No. 46), and 6α,19,19-trifluoro-16α-methyl-Δ⁴-pregnene-17α-ol-3,20-dione acetate (Cpd. No. 47).

EXAMPLE XI

The compounds Nos. 44 and 45 were respectively treated by the procedure of Example V, thus giving correspondingly: 6α-chloro-19,19-difluoro-Δ¹,⁴-pregnadiene-3,20-dione (Cpd. No. 48) and 6α-chloro-19,19-difluoro- 16α-methyl-Δ$^{1,4}$-pregnadiene-17α-ol-3,20 - dione acetate (Cpd. No. 49).

EXAMPLE XII

The compounds Nos. 44 and 45 were respectively treated by the procedure of Example VI, thus giving correspondingly: 6-chloro - 19,19-difluoro-Δ$^{4,6}$-pregnadiene-3,20-dione (Cpd. No. 50) and 6-chloro-19,19-difluoro-16α - methyl-Δ$^{4,6}$-pregnadiene - 17α-ol-3,20 - dione acetate (Cpd. No. 51).

EXAMPLE XIII

A solution of 0.17 g. of potassium hydroxide in 0.2 cc. of water and 2.5 cc. of methanol was added over 30 minutes to a boiling solution of 1 g. of 19,19-difluoro-Δ$^5$-pregnene-3β,17α-diol-20-one 17-acetate (Cpd. No. 19) in 30 cc. of methanol under an atmosphere of nitrogen. Boiling was continued for a further 2 hours and the solution was then cooled, neutralized with acetic acid and concentrated under reduced pressure. Addition of water, followed by crystallization of the precipitated solid from acetone-hexane, produced 19,19-difluoro-Δ$^5$-pregnene-3β,17α-diol-20-one (Cpd. No. 52).

Following the same procedure, there were treated the compounds Nos. 20, 21, 26, 28, 33, 34, 35, 37, 41, 43, 45, 47, 49 and 51 thus affording respectively—

Cpd. No.:
53. 19,19-difluoro-16α-methyl-Δ$^5$-pregnene-3β,17α-diol-20-one.
54. 19,19-difluoro-16β-methylΔ$^5$-pregnene-3β,17α-diol-20-one.
55. 19,19-difluoro-Δ$^4$-pregnene-17α-ol-3,20-dione.
56. 19,19-difluoro-16α-methyl-Δ$^4$-pregnene-17α-ol-3,20-dione.
57. 19,19-difluoro-16β-methyl-Δ$^4$-pregnene-17α-ol-3,20-dione.
58. 19,19-difluoro-Δ$^{1,4}$-pregnadiene-17α-ol-3,20-dione.
59. 19,19-difluoro-16α-methyl-Δ$^{1,4}$-pregnadiene-17α-ol-3,20-dione.
60. 19,19-difluoro-16β-methyl-Δ$^{1,4}$-pregnadiene-17α-ol-3,20-dione.
61. 19,19-difluoro-16α-methyl-Δ$^{4,6}$-pregnadiene-17α-ol-3,20-dione.
62. 6β-chloro-19,19-difluoro-16α-methyl-Δ$^4$-pregnene-17α-ol-3,20-dione.
63. 6β,19,19-trifluoro-16α-methyl-Δ$^4$-pregnene-17α-ol-3,20-dione.
64. 6α-chloro-19,19-difluoro-16α-methyl-Δ$^4$-pregnene-17α-ol-3,20-dione.
65. 6α,19,19-trifluoro-16α-methyl-Δ$^4$-pregnene-17α-ol-3,20-dione.
66. 6α-chloro-19,19-difluoro-16α-methyl-Δ$^{1,4}$-pregnadiene-17α-ol-3,20-dione.
67. 6-chloro-19,19-difluoro-16α-methyl-Δ$^{4,6}$-pregnadiene-17α-ol-3,20-dione.

EXAMPLE XIV 1 g. of 19,19-difluoro-16α,17α-isopropylidenedioxy-Δ$^5$-pregnene-3β-ol-20-one (Cpd. No. 18) was heated on the steam bath with 100 cc. of 80% acetic acid under nitrogen for 7 hours, it was then concentrated under vacuum to a small volume and poured into water. The precipitate was collected, washed well with water, dried and recrystallized from acetone-hexane, thus furnishing 19,19-difluoro-Δ$^5$-pregnene-3β,16α,17α-triol-20-one (Cpd. No. 68).

Following the above procedure, there were treated the compounds Nos. 25 and 32 thus affording respectively: 19,19-difluoro-Δ$^4$-pregnene-16α,17α-diol-3,20-dione (Cpd. No. 69) and 19,19-difluoro-Δ$^{1,4}$-pregnadiene-16α,17α-diol-3,20-dione (Cpd. No. 70).

EXAMPLE XV

To a solution of 5 g. of 19,19-difluoro-Δ$^5$-pregnene-3β,17α-diol-20-one (Cpd. No. 52) in 100 cc. of anhydrous benzene there were added 1 g. of p-toluene-sulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 19,19-difluoro-Δ$^5$-pregnene-3β,17α-diol-20-one dicaproate (Cpd. No. 71).

The compounds Nos. 55, 64, 68, and 69 were converted by the above procedure, respectively into—

Cpd. No.:
72. 19,19-difluoro - Δ$^4$-pregnene - 17α-ol - 3,20-dione caproate.
73. 6α-chloro - 19,19-difluoro - 16α-methyl-Δ$^4$-pregnene-17α-ol-3,20-dione caproate.
74. 19,19-difluoro - Δ$^5$-pregnene-3β,16α,17α-triol-20-one tricaproate.
75. 19,19-difluoro - Δ$^4$-pregnene-16α,17α-diol - 3,20-dione dicaproate.

EXAMPLE XVI

The compounds Nos. 36, 37 and 50 were treated according to Example V, thus yielding respectively: 19,19-difluoro - Δ$^{1,4,6}$-pregnatriene - 3,20-dione (Cpd. No. 76), 19,19-difluoro-16α-methyl-Δ$^{1,4,6}$-pregnatriene - 3,20-dione (Cpd. No. 77) and 6-chloro-19,19-difluoro-16α-methyl-Δ$^{1,4,6}$-pregnatriene-3,20-dione (Cpd. No. 78).

EXAMPLE XVII

The compounds Nos. 32, 69, 70 and 75 were treated in accordance with Example VI, thus yielding respectively: 19,19-difluoro - 16α,17α-isopropylidenedioxy - Δ$^{1,4,6}$-pregnatriene-3,20-dione (Cpd. No. 79), 19,19-difluoro-Δ$^{4,6}$-pregnadiene - 16α,17α-diol - 3,20-dione (Cpd. No. 80), 19,19-difluoro-Δ$^{1,4,6}$-pregnatriene - 16α,17α-diol - 3,20-dione (Cpd. No. 81) and 19,19-difluoro-Δ$^{4,6}$-pregnadiene-16α,17α-diol-3,20-dione dicaproate (Cpd. No. 82).

We claim:
1. A compound of the following formula:

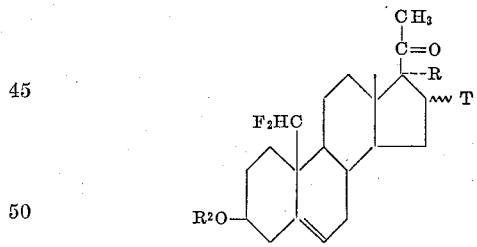

wherein R is a member of the group consisting of hydrogen, hydroxyl and a hydrocarbon carboxylic acyloxy group of less than 12 carbon atoms; T is selected from the group consisting of hydrogen, α-hydroxyl, α-hydrocarbon carboxylic acyloxy of less than 12 carbon atoms, α-methyl and β-methyl; T and R together are the group

wherein $R^3$ and $R^4$ each is a lower alkyl group; and $R^2$ is selected from the group consisting of hydrogen and a hydrocarbon carboxylic acyl group of less than 12 carbon atoms.

2. 19,19-difluoro-Δ$^5$-pregnen-3β-ol-20-one.
3. 19,19-difluoro-16α-methyl-Δ$^5$-pregnen-3β-ol-20-one.
4. 19,19-difluoro-16β-methyl-Δ$^5$-pregnen-3β-ol-20-one.
5. 19,19-difluoro - 16α,17α-isopropylidenedioxy - Δ$^5$-pregnen-3β-ol-20-one.
6. 19,19-difluoro-Δ$^5$-pregnen-3β,17α-diol-20-one 17-acetate.
7. 19,19-difluoro - 16α-methyl-Δ$^5$-pregnen - 3β,17α-diol-20-one 17-acetate.

8. 19,19-difluoro - 16β-methyl-Δ⁵-pregnen-3β,17α-diol-20-one 17-acetate.

9. A compound of the following formula:

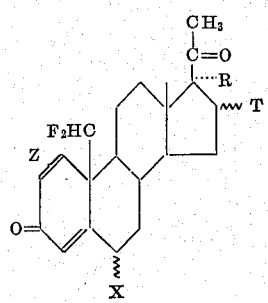

wherein R is a member of the group consisting of hydrogen, hydroxyl and a hydrocarbon carboxylic acyloxy group of less than 12 carbon atoms; T is selected from the group consisting of hydrogen, α-hydroxyl, α-hydrocarbon carboxylic acyloxy of less than 12 carbon atoms, α-methyl and β-methyl; T and R together are the group

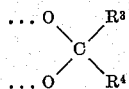

wherein R³ and R⁴ each is a lower alkyl group; Z is selected from the group consisting of a double bond and a saturated linkage between C-1 and C-2 and X is a member of the group consisting of hydrogen, α-fluorine, β-fluorine, α-chlorine and β-chlorine.

10. 19,19-difluoro-16α-methyl-Δ⁴-pregnene-3,20-dione.
11. 19,19-difluoro-16β-methyl-Δ⁴-pregnene-3,20-dione.
12. 19,19-difluoro-16α,17α - isopropylidenedioxy - Δ⁴-pregnene-3,20-dione.
13. 19,19-difluoro-Δ-pregnen-17α-ol-3,20-dione acetate.
14. 19,19-difluoro-16α-methyl-Δ⁴-pregnen - 17α - ol-3,20-dione acetate.
15. 19,19-difluoro-16β-methyl-Δ⁴-pregnen - 17α - ol-3,20-dione acetate.
16. 19,19-difluoro-Δ⁴-pregnene-3,20-dione.
17. 6β-chloro-19,19-difluoro-Δ⁴-pregnene-3,20-dione.
18. 6α-chloro-19,19-difluoro-Δ⁴-pregnene-3,20-dione.
19. 6β,19,19-trifluoro-Δ⁴-pregnene-3,20-dione.
20. A compound of the following formula:

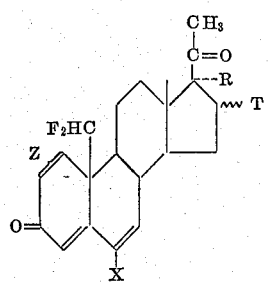

wherein R is a member of the group consisting of hydrogen, hydroxyl and a hydrocarbon carboxylic acyloxy group of less than 12 carbon atoms; T is selected from the group consisting of hydrogen, α-hydroxyl, α-hydrocarbon carboxylic acyloxy of less than 12 carbon atoms, α-methyl and β-methyl; T and R together are the group

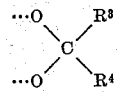

wherein R³ and R⁴ each is a lower alkyl group; Z is selected from the group consisting of a double bond and a saturated linkage between C-1 and C-2; and X is selected from the group consisting of hydrogen, fluorine and chlorine.

No references cited.

LEWIS GOTTS, *Primary Examiner.*

THOMAS M. MESHBESHER, *Assistant Examiner.*